(12) United States Patent
Hu et al.

(10) Patent No.: US 12,553,880 B2
(45) Date of Patent: Feb. 17, 2026

(54) AIR BLOWING METHOD-BASED ALCOHOL SENSOR, AND SMART DEVICE

(71) Applicant: SHENZHEN EVERBEST MACHINERY INDUSTRY CO., LTD., Guangdong (CN)

(72) Inventors: Jianyun Hu, Guangdong (CN); Lijun Zhong, Guangdong (CN)

(73) Assignee: SHENZHEN EVERBEST MACHINERY INDUSTRY CO., LTD., Shenzhen (CN)

( * ) Notice: Subject to any disclaimer, the term of this patent is extended or adjusted under 35 U.S.C. 154(b) by 318 days.

(21) Appl. No.: 18/035,735

(22) PCT Filed: Dec. 4, 2020

(86) PCT No.: PCT/CN2020/134082
§ 371 (c)(1),
(2) Date: May 6, 2023

(87) PCT Pub. No.: WO2022/116205
PCT Pub. Date: Jun. 9, 2022

(65) Prior Publication Data
US 2023/0408488 A1    Dec. 21, 2023

(51) Int. Cl.
*G01N 33/497*  (2006.01)
*G01N 33/00*   (2006.01)

(52) U.S. Cl.
CPC ..... *G01N 33/4972* (2013.01); *G01N 33/0016* (2013.01); *G01N 33/007* (2013.01); *G01N 33/0073* (2013.01)

(58) Field of Classification Search
CPC ........... G01N 33/4972; G01N 33/0016; G01N 33/007; G01N 33/0073
See application file for complete search history.

(56) References Cited

U.S. PATENT DOCUMENTS

| | | | |
|---|---|---|---|
| 2006/0091007 A1* | 5/2006 | Inoue ................. | G01N 27/4175 204/426 |
| 2014/0027281 A1* | 1/2014 | Fodor ................. | G01N 27/4045 204/431 |

(Continued)

FOREIGN PATENT DOCUMENTS

| CN | 200986551 Y | 12/2007 |
|---|---|---|
| CN | 201149594 Y | 11/2008 |

(Continued)

OTHER PUBLICATIONS

International Search Report of PCT Patent Application No. PCT/CN2020/134082 issued on Sep. 9, 2021.

*Primary Examiner* — Fatemeh Esfandiari Nia
(74) *Attorney, Agent, or Firm* — Fideli Law PLLC; Qiang Li

(57) ABSTRACT

An air blowing method-based alcohol sensor and a smart device. The alcohol sensor comprises an alcohol measurement module, an air pressure measurement module, an MCU processor, a circuit substrate, and a housing coveringly arranged on the circuit substrate; the alcohol measurement module transmits a concentration signal thereof to the MCU processor by means of a sampling and amplification circuit module, the air pressure measurement module and the MCU processor are mutually connected and implement transmission of an air pressure signal, and the MCU processor, after performing processing on the concentration signal and the air pressure signal, outputs an alcohol concentration value. The alcohol measurement module and the air pressure measurement module are integrated within the housing.

7 Claims, 4 Drawing Sheets

(56) References Cited

U.S. PATENT DOCUMENTS

2017/0176411 A1\* 6/2017 Trainor ................ B60K 28/063
2019/0290959 A1\* 9/2019 Chesbrough ......... A61B 5/0816

FOREIGN PATENT DOCUMENTS

CN 206719035 U \* 12/2017
CN 209946060 U \* 1/2020

\* cited by examiner

AIR BLOWING METHOD-BASED ALCOHOL SENSOR, AND SMART DEVICE

TECHNICAL FIELD

The present application relates to the technical field of smart devices, and more particularly to an air blowing method-based alcohol sensor and a smart device.

BACKGROUND ART

An alcohol sensor is a test tool used to measure an alcohol content of air exhaled from a human body, and is also a measurement tool used by a traffic police to determine whether a driver has drunk alcohol or how much alcohol the driver has drunk during law enforcement, so that traffic accidents can be effectively avoided. In addition, the alcohol sensor can also be applied in some high-risk areas or areas where work after drinking is prohibited.

In order to meet the signal requirements, a conventional alcohol sensor has a large volume and thus has limited applications. Generally, it is only used in a professional alcohol measurement instrument. Furthermore, some people cannot be normally measured due to the fact that the amount of blown air does not meet the requirements during testing. The conventional alcohol sensor cannot solve this problem, which results in low measurement efficiency during the use of the alcohol measurement instrument.

TECHNICAL PROBLEMS

An objective of the embodiments of the present application is to provide an air blowing method-based alcohol sensor and a smart device, so as to solve the technical problems in the prior art of an alcohol sensor being unable to measure the amount of blown air and having low measurement efficiency during application.

TECHNICAL SOLUTIONS

To achieve the foregoing objective, a technical solution adopted in the present application is to provide an air blowing method-based alcohol sensor, comprising an alcohol measurement module, an air pressure measurement module, an MCU processor, a circuit substrate, and a housing coveringly arranged on the circuit substrate. The alcohol measurement module transmits a concentration signal thereof to the MCU processor by means of a sampling and amplification circuit module, the air pressure measurement module and the MCU processor are mutually connected and implement transmission of an air pressure signal, and the MCU processor, after performing processing on the concentration signal and the air pressure signal, outputs an alcohol concentration value.

Further, the housing is provided with a first accommodating cavity in communication with the outside, the alcohol measurement module is arranged in the first accommodating cavity, the bottom of the housing is provided with a second accommodating cavity, the top of the housing is provided with an air channel in communication with the outside and the second accommodating cavity, and the air pressure chip is located in the second accommodating cavity.

Further, the air channel comprises a depressed opening at the top, a funnel-shaped channel extending downwardly along the depressed opening, and a columnar channel extending downwardly along the funnel-shaped channel, the columnar channel being in communication with the second accommodating cavity.

Further, the air pressure measurement module is fixed to the circuit substrate by means of a flexible adhesive.

Further, the housing is further provided with a third accommodating cavity, the MCU processor is located in the third accommodating cavity, and the third accommodating cavity is filled with a sealant for sealing the MCU processor.

Further, the alcohol measurement module comprises a first solid electrolyte membrane arranged in the first accommodating cavity, a first catalyst wire arranged at a top surface of the first solid electrolyte membrane and electrically connected to the MCU processor, and a second catalyst wire arranged at a bottom surface of the first solid electrolyte membrane and electrically connected to the MCU processor.

Further, the alcohol sensor further comprises a breathable film arranged at the top of the accommodating cavity, wherein an external air passes through the breathable film to react with the first solid electrolyte membrane, the first catalyst wire and the second catalyst wire.

Further, a membrane pressing plate is further arranged in the first accommodating cavity and located at the bottom of the first solid electrolyte membrane, the membrane pressing plate fixes the first solid electrolyte membrane, the first catalyst wire and the second catalyst wire in the accommodating cavity, and the membrane pressing plate is fixed in the accommodating cavity by means of a sealant.

Further, a second solid electrolyte membrane is further arranged in the accommodating cavity and located at the bottom of the first solid electrolyte membrane, and the second catalyst wire is located between the second solid electrolyte membrane and the first solid electrolyte membrane.

Further, a switch transistor is connected in parallel to two ends of the alcohol measurement module, and the sampling and amplification circuit module is a current-type sampling and amplification circuit.

Further, the switch transistor is a P-type MOS transistor, and the current-type sampling and amplification circuit comprises an operational amplifier, a first capacitor, a first resistor, a second resistor, a third resistor and a fourth resistor, wherein a source electrode of the P-type MOS transistor and a non-inverting input end of the operational amplifier are both connected to one end of the alcohol measurement module, a drain electrode of the P-type MOS transistor is connected to the other end of the alcohol measurement module, an inverting input end of the operational amplifier is connected to the other end of the alcohol measurement module by means of the first resistor, a grid electrode of the P-type MOS transistor and a positive power supply of the operational amplifier are both connected to a power supply VDD, the grid electrode of the P-type MOS transistor is further grounded sequentially by means of the second resistor and the third resistor, and a connection point of the second resistor and the third resistor is also connected to the non-inverting input end of the operational amplifier; and the first capacitor and the fourth resistor are both connected in parallel between the inverting input end of the operational amplifier and an output end of the operational amplifier, and the output end of the operational amplifier is connected to an input end of the MCU processor by means of an RC circuit.

The present application further provides a smart device, comprising a main body in which the air blowing method-based alcohol sensor as described above is arranged.

Beneficial Effects

The present application has the following beneficial effects: compared with the prior art, the alcohol measurement module and the air pressure measurement module are integrated within the housing in the present application, and due to the alcohol measurement module and the air pressure measurement module being in communication with the outside, it can be determined in real time whether insufficient air is being blown during measurement according to an air blowing situation of a user, the user being notified to blow air again or a valid real time concentration being displayed, and the authenticity and accuracy of measurement can still be guaranteed while reducing the size of the alcohol sensor.

BRIEF DESCRIPTION OF THE DRAWINGS

In order to more clearly describe the technical solutions in the embodiments of the present application, the drawings required for describing the embodiments or the prior art will be briefly described below. Apparently, the drawings in the following description merely show some of the embodiments of the present application, and those of ordinary skill in the art would have obtained other drawings according to these drawings without involving any inventive effort.

Figure 1:
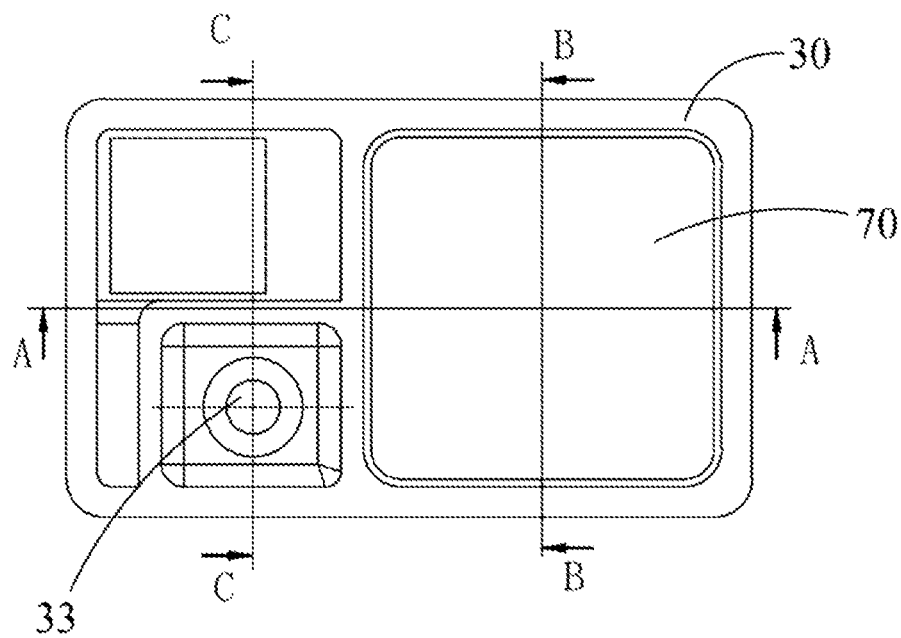
FIG. 1 is a top view of an air blowing method-based alcohol sensor provided in an embodiment of the present application.
Figure 2:
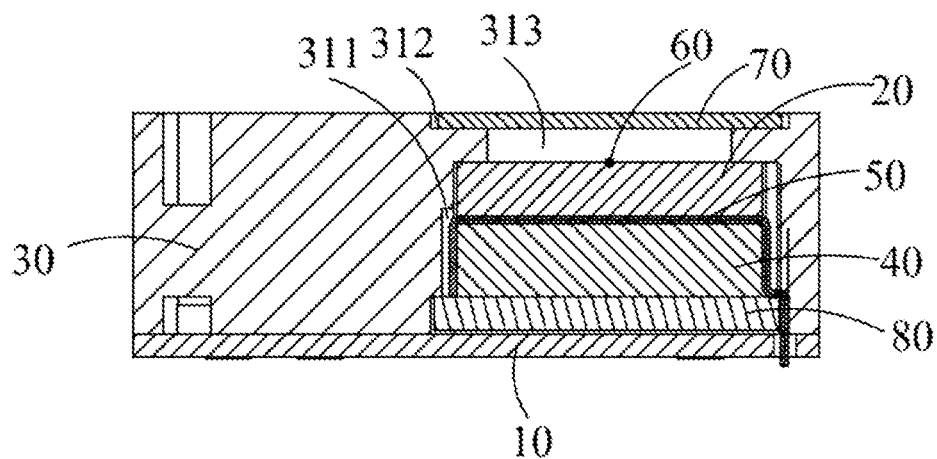
FIG. 2 is a cross-sectional view taken along line A-A in FIG. 1.
Figure 3:
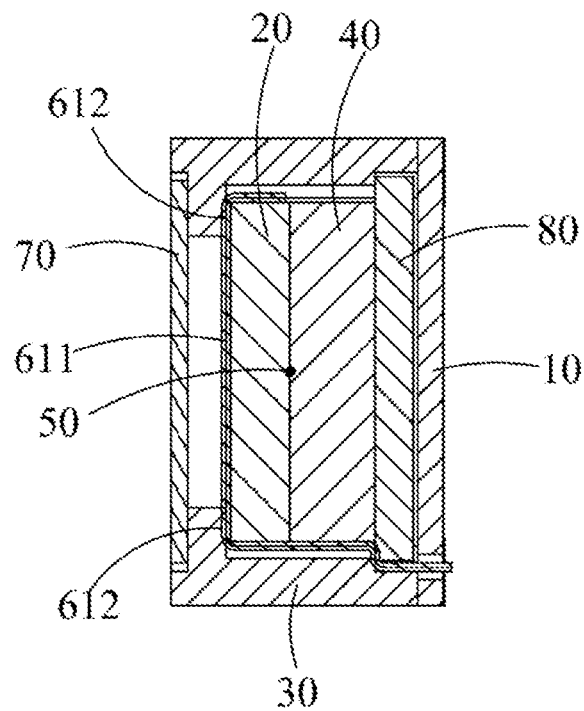
FIG. 3 is a cross-sectional view taken along line B-B in FIG. 1.

Reference Numerals in the Drawings are as Follows:
10—Circuit substrate; 11—Air pressure measurement module; 12—MCU processor; 13—Welding hole; 20—First solid electrolyte membrane; 30—Housing; 31—First accommodating cavity; 311—Bottom cavity; 312—Top opening; 313—Channel; 33—Air channel; 34—Second accommodating cavity; 35—Third accommodating cavity; 40—Second solid electrolyte membrane; 60—First catalyst wire; 61—First reaction portion; 62—First connection portion; 63—First fixing portion; 50—Second catalyst wire; 51—Second reaction portion; 52—Second connection portion; 53—Second fixing portion; 511—Middle portion of the second reaction portion; 512—Two ends of the second reaction portion; 70—Breathable film; 80—Membrane pressing plate; 82—First limiting groove; 81—Second limiting groove.

Implementations of the Invention

In order to make the technical problems to be solved, the technical solutions, and the beneficial effects of the present application clearer, the present application will be described in further detail below with reference to the drawings and embodiments. It should be understood that the specific embodiments described herein are merely used to explain the present application and are not intended to limit the present application.

It should be noted that when an element is referred to as being "fixed to" or "arranged at" a further element, it can be directly located on the further element or indirectly located on the further element. When an element is referred to as being "connected to" a further element, it can be directly connected to the further element or indirectly connected to the further element.

It should be understood that the orientations or positional relationships indicated by the terms "length", "width", "upper", "lower", "front", "rear", "left", "right", "vertical", "horizontal", "top", "bottom", "inner", "outer", etc. are based on the orientations or positional relationships shown in the drawings, and are only for the convenience of describing the present application and simplifying the description, rather than indicating or implying that device or element referred to must have a specific orientation or be constructed and operated in a specific orientation, and therefore cannot be construed as limiting the present application.

In addition, the terms "first" and "second" are used for descriptive purposes only, and cannot be construed as indicating or implying relative importance or implicitly indicating the number of technical features indicated. Thus, the features defined with "first" and "second" can explicitly or implicitly include one or more of the features. In the description of the present application, the meaning of "a plurality of" is two or more, unless otherwise explicitly and specifically defined.

Referring to FIGS. 1 to 6, an air blowing method-based alcohol sensor provided in an embodiment of the present application will be described below.

The air blowing method-based alcohol sensor provided in this embodiment generally has a cuboid shape. The air blowing method-based alcohol sensor comprises a circuit substrate 10, an air pressure measurement module 11 and an MCU processor 12 that are arranged on the circuit substrate and a housing 30 coveringly arranged on the circuit substrate 10. The housing 30 is provided with a first accommodating cavity 31 in communication with the outside, an alcohol measurement module is arranged in the first accommodating cavity 31, the housing 30 is provided with an air channel 33 in communication with the outside, the air pressure measurement module 11 is located at the bottom of the air channel 33, and the alcohol measurement module transmits a concentration signal thereof to the MCU processor 12 by means of a sampling and amplification circuit module. The air pressure measurement module 11 and the MCU processor 12 are mutually connected and implement transmission of an air pressure signal. The MCU processor 12, after performing processing on the concentration signal and the air pressure signal, outputs an alcohol concentration value.

In the present application, the air pressure measurement module 11 is added to the sensor, and the air channel 33 is arranged in the housing 30, so that during measurement, part of blown air is subjected to alcohol measurement by the alcohol measurement module, and the other part of the air acts on the air pressure measurement module 11 through the air channel. When the air pressure value monitored by the air pressure measurement module 11 is less than a set pressure value for normal air blowing, it can be determined that the user blows insufficient air at that moment, no alcohol measurement result is read, and the user is notified to blow air again. Since the alcohol sensor in the present application is provided with the air pressure measurement module 11 and the MCU processor 12, a function of notifying air blowing is added, and when it is applied to various measurement devices, the measurement efficiency is increased.

Figure 4:
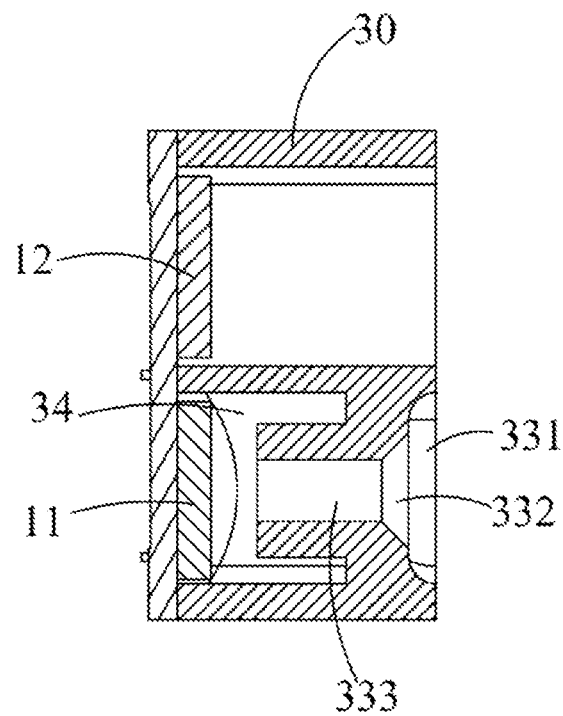
FIG. 4 is a cross-sectional view taken along line C-C in FIG. 1.

Referring to FIG. 4, the bottom of the housing 30 is provided with a second accommodating cavity 34, the air pressure measurement module 11 is located in the second accommodating cavity 34, and the air channel 33 passes downwardly from the top of the housing 30 to the second accommodating cavity 34. With the provision of the second accommodating cavity 34 for placing the air pressure measurement module 11, the air pressure measurement module 11 is completely placed in the housing 30, and the air channel 33 is in communication with the second accommodating cavity 34, so that the sealing performance is better, and the accuracy of air pressure monitoring is thus ensured.

Specifically, the air channel 33 may be divided into three parts, including a depressed opening 331 at the top, a funnel-shaped channel 332 extending downwardly along the depressed opening 331, and a columnar channel 333 extending downwardly along the funnel-shaped channel 332. The columnar channel 333 is in communication with the second accommodating cavity 34. By depressing the opening, the height of the channel is reduced, and a distance between air and the air pressure measurement module 11 is shortened. In addition, the depressed opening 331 and the funnel-shaped channel 332 enlarge the air intake area, so that the air can enter the columnar channel 333 more easily, achieving rapid monitoring.

Further, the air pressure measurement module 11 is fixed to the circuit substrate 10 by means of a flexible adhesive (not shown in the drawings). With the provision of the flexible adhesive herein, the air pressure measurement module 11 and a circuit on the circuit substrate 10 are fixed together; and when the air acts downwardly on the air pressure measurement module 11, the air pressure measurement module 11 is deformed downwardly, and the flexible adhesive at the bottom of the air pressure measurement module 11 plays a buffering role, providing a deformation space for the air pressure measurement module 11.

In this embodiment, the housing 30 is further provided with a third accommodating cavity 35, and after the MCU processor 12 is placed on the circuit substrate 10 and located in the third accommodating cavity 35, the effects of fixing the MCU processor 12 and sealing the third accommodating cavity 35 are exerted by filling the third accommodating cavity 35 with a sealant 36, preventing the air from entering the third accommodating cavity 35, and ensuring that more air enters the air channel and acts on the air pressure measurement module 11.

In this embodiment, the alcohol measurement module located in the first accommodating cavity 31 comprises a first solid electrolyte membrane 20 arranged in the first accommodating cavity 31, a first catalyst wire 60 arranged at a top surface of the first solid electrolyte membrane 20 and electrically connected to the MCU processor 12, and a second catalyst wire 50 arranged at a bottom surface of the first solid electrolyte membrane 20 and electrically connected to the MCU processor 12.

In this embodiment, alcohol testing components such as the first solid electrolyte membrane 20, the first catalyst wire 60 and the second catalyst wire 50 are arranged in the compact housing 30, so that an internal structure of the alcohol sensor is more compact. In addition, the circuit substrate 10 may be used as a part of the bottom housing while achieving electrical connection, so that the entire height of the sensor is reduced, a lightweight and thin design can be better realized, the integration degree is also higher, and the alcohol sensor can be better applied to various smart devices.

Further, in this embodiment, a second solid electrolyte membrane 40 is further arranged in the first accommodating cavity 31 and located at the bottom of the first solid electrolyte membrane 20, and the second catalyst wire 50 is located between the second solid electrolyte membrane 40 and the first solid electrolyte membrane 20. With the provision of the two solid electrolyte membranes, the reaction effect of alcohol and the membranes and the catalyst wires is enhanced.

In this embodiment, the first solid electrolyte membrane 20 and the second solid electrolyte membrane 40 have a substantially square cross-section, which may be sized to be 4 mm*4 mm. Of course, the size of the solid electrolyte membranes may also be adjusted according to the overall size requirements of the alcohol sensor. As proton exchange membranes, the solid electrolyte membranes have good chemical resistance and good mechanical properties, so that the solid electrolyte membranes can be very thin to ensure the free movement of ions during the reaction, are acidic and can react with alcohol in the air.

The first catalyst wire 60 and the second catalyst wire 50 are substantially the same in structure, and may be structurally varied. For example, the first catalyst wire 60 and the second catalyst wire 50 may have an inverted L shape. That is, the first catalyst wire 60 comprises a horizontal first reaction portion 61 and a first connection portion 62 bent downwardly along the first reaction portion 61. The first reaction portion 61 is attached to the top surface of the first solid electrolyte membrane 20, and the first connection portion 62 extends out along a side surface of the first solid electrolyte membrane and is electrically connected to the circuit substrate 10. The second catalyst wire 50 comprises a horizontal second reaction portion 51 and a second connection portion 52 bent downwardly along the second reaction portion 51. The second reaction portion 51 is attached to the top surface of the second solid electrolyte membrane 40, and the second connection portion 52 extends out along a side surface of the second solid electrolyte membrane 40 and is electrically connected to the circuit substrate 10. During measurement, the air enters the top of the first accommodating cavity 31 and chemically reacts with the first solid electrolyte membrane 20 and the second solid electrolyte membrane 40 so as to generate sufficient electric charges, while the first catalyst wire 60 and the second catalyst wire 50 extend out as conductive electrodes and are electrically connected to the circuit substrate 10 so as to implement signal transmission.

Figure 6:
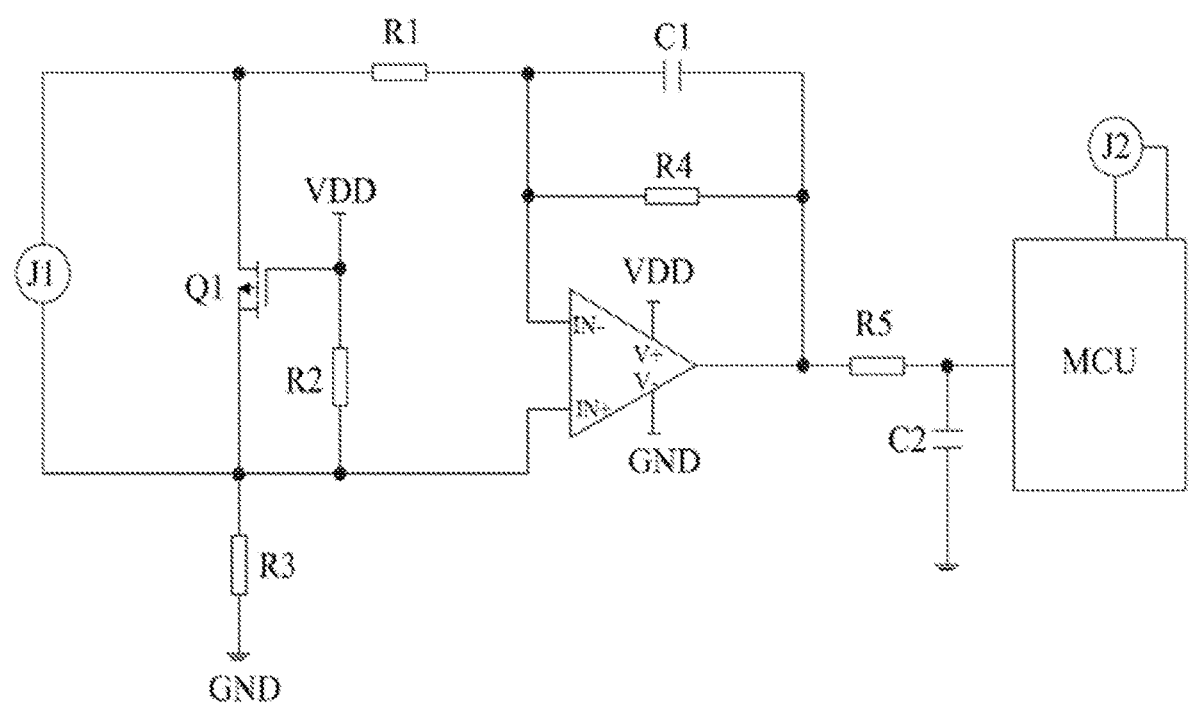
FIG. 6 is a schematic diagram showing a circuit structure of an air blowing method-based alcohol sensor provided in an embodiment of the present application.

During mounting, the two catalyst wires and the two solid electrolyte membranes are pressed against each other. The purpose is to fix the two catalyst wires more firmly, avoiding falling off. In this embodiment, the two catalysts have the structure as shown in FIG. 6.

The first catalyst wire 60 further comprises a first fixing portion 63 bent downwardly along an end of the first reaction portion 61. The first fixing portion 63 is attached to a side surface of the first solid electrolyte membrane 20 and is opposed to the first connection portion 62. The second catalyst wire 50 further comprises a second fixing portion 53 bent downwardly along an end of the second reaction portion 51. The second fixing portion 53 is attached to a side surface of the second solid electrolyte membrane 40 and is opposed to the second connection portion 52. In this way, during mounting, the first fixing portion 63 of the first catalyst wire 60 is hooked to one side surface of the first solid electrolyte membrane 20, and the first connection portion 62 extends out from the other opposite side surface of the first solid electrolyte membrane 20. Similarly, the second fixing portion 53 of the second catalyst wire 50 is hooked to one side surface of the second solid electrolyte membrane 40, and the second connection portion 52 extends out from the other opposite side surface of the second solid electrolyte membrane 40. With such a structure, the first catalyst wire 60 and the second catalyst wire 50 are more firmly mounted and are less likely to fall off.

Although there is no direct contact between the first catalyst wire 60 and the second catalyst wire in this embodiment, the first catalyst wire 60 and the second catalyst wire 50 are spatially arranged crosswise, namely, the first reaction portion 61 and the second reaction portion 51 of the reaction portion are arranged in a cross manner, so that the first connection portion 62 and the second connection portion 52 can extend out from different side surfaces of the solid electrolyte membranes, avoiding short circuiting caused by mutual contact when they extend out from the same side surface. Of course, the first catalyst wire 60 and the second catalyst wire 50 may also be arranged in other manners, such as in a parallel or non-parallel manner. It is only required to ensure that the connection portions of the two catalyst wires are not in contact with each other.

In order to better fix the two solid electrolyte membranes and the two catalyst wires in the first accommodating cavity 31, in this embodiment, a membrane pressing plate 80 is further arranged in the first accommodating cavity 31 and located at the bottom of the first solid electrolyte membrane During mounting, the housing 30 is first inverted, the second catalyst wire 50; and the second solid electrolyte membrane 40, the first catalyst wire 60 and the first solid electrolyte membrane 20 are sequentially placed into the housing, then pressed by the membrane pressing plate 80, and finally sealed and fixed by means of a sealant.

In this embodiment, since the membrane pressing plate 80 is provided at the bottom, in order to better allow the first catalyst wire 60 and the second catalyst wire 50 to extend out and be electrically connected to the circuit substrate 10, a first limiting groove 82 and a second limiting groove 81 are respectively formed in side walls of the membrane pressing plate 80, the first connection portion 62 of the first catalyst wire 60 downwardly extends out along the inside of the first limiting groove 82 and is electrically connected to the circuit substrate 10, and the second connection portion 52 of the second catalyst wire 50 downwardly extends out along the second limiting groove 81 and is electrically connected to the circuit substrate 10.

Figure 5:
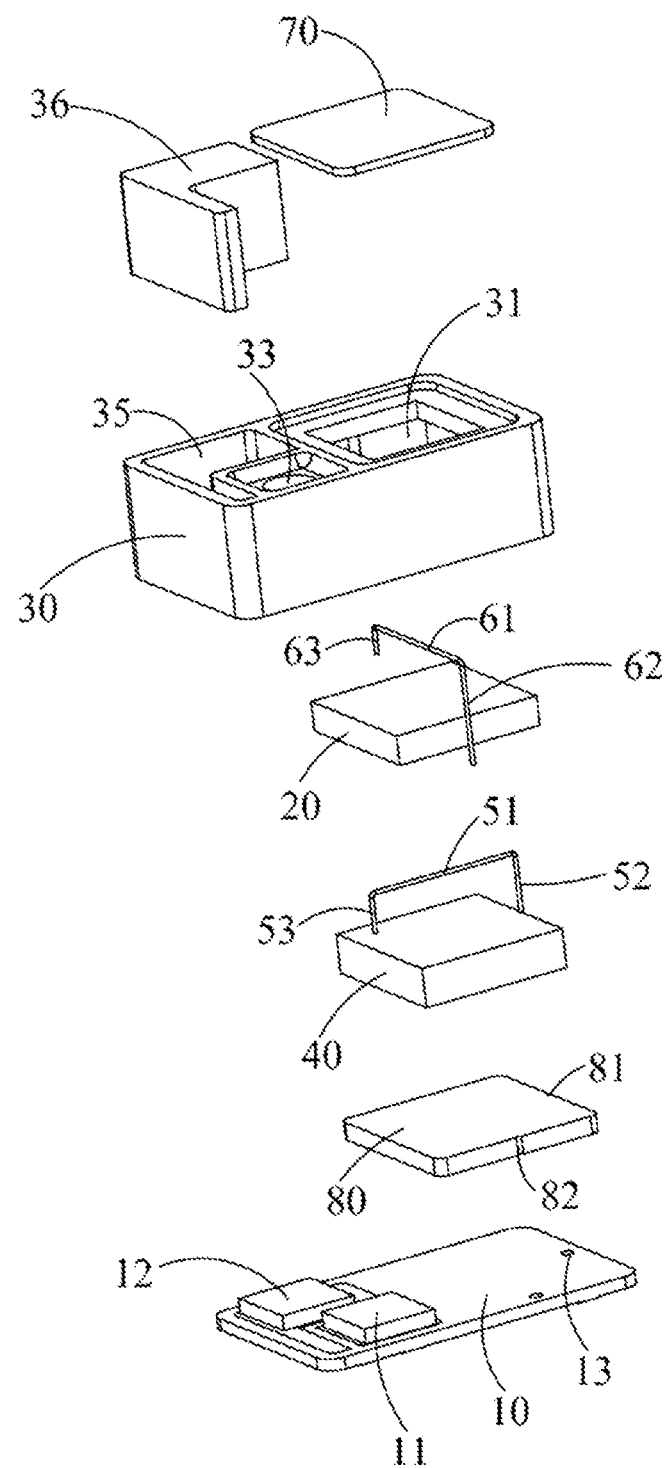
FIG. 5 is a schematic exploded view of an air blowing method-based alcohol sensor provided in an embodiment of the present application.

It can be seen from FIG. 5 that in this embodiment, the first accommodating cavity 31 passes through in a vertical direction, and can be divided into three parts according to the size of passage, namely, a bottom cavity 311, a top opening 312 and a channel 313 for communicating the bottom cavity 311 with the top opening 312. The membrane pressing plate 80, the first solid electrolyte membrane 20 and the second solid electrolyte membrane 40 are sequentially arranged in the bottom cavity 311, a breathable film 70 is arranged in the top opening 312, and the channel 313 located between the bottom cavity 311 and the top opening 312 is filled with air. In this way, it is ensured that the first solid electrolyte membrane 20, the second solid electrolyte membrane 40 and the breathable film 70 can be in sufficient contact with the air, thereby forming a sufficiently large current to ensure the testing accuracy. Moreover, in the above structure, a middle portion 611 of the second reaction portion 51 of the second catalyst wire 50 directly faces the channel 313, and a top wall of the bottom cavity 311 is pressed at two ends of the second reaction portion 51. In this way, the second reaction portion 51 of the second catalyst wire 50 can be in sufficient contact with the air in the channel 313 and the top opening 312, and the top wall of the bottom cavity 311 also functions a to press the two ends 612 of the second reaction portion 51 to some extent, so that better fixation can be achieved between the second catalyst wire 50 and the second solid electrolyte membrane 40.

In this embodiment, the top opening 312 is a depressed stepped hole formed in the top surface of the housing 30, the breathable film 70 is arranged on a stepped surface of the depressed stepped hole, and outside air can penetrate the breathable film 70 and reacts with the first solid electrolyte membrane the first catalyst wire 60 and the second catalyst wire 50. The breathable film 70 can filter water vapor and dust from the air, and also has a good air permeability, ensuring the passing of clean air and making measurement more accurate. Of course, the breathable film 70 may also be omitted from the alcohol sensor in this embodiment, and when the alcohol sensor is specifically applied to various devices or apparatuses, providing the devices or apparatuses with a breathable film 70 can also provide water-proof, dust-proof and air-permeable functions. The depressed stepped bore has a square cross-section, and the channel 313 and the bottom cavity 311 that are in communication therewith also have square cross-sections. With the square top opening, an air inlet can be maximized in a limited area such that a sufficient amount of intake air can be effectively guaranteed, a miniature alcohol sensor will not have a smaller signal than a conventional alcohol sensor; and the square first accommodating cavity 31 is large in size, facilitating the chemical reaction of alcohol with the two catalyst wires and the two solid electrolyte membranes.

Further, in this embodiment, a heating device (not shown) is further arranged in the first accommodating cavity 31. The heating device may specifically be a heating sheet, and after testing, the air with alcohol can be volatilized quickly by heating the first accommodating cavity 31, so that there is no residual air in the first accommodating cavity 31, namely, the alcohol in the first accommodating cavity 31 is also cleared to ensure the accuracy of a next test.

In this embodiment, the material of the first catalyst wire 60 and the second catalyst wire 50 is a noble metal. Specifically, the noble metal may be a platinum wire. Of course, other noble metals may be used to make the catalyst wires.

In this embodiment, the circuit substrate 10 comprises a circuit substrate 11 and components (not shown) arranged on the circuit substrate. Two welding holes 13 are formed in the circuit substrate 11, and the first catalyst wire 60 and the second catalyst wire 50 are respectively welded to the two welding holes 13 after extending out from the first limiting groove 82 and the second limiting groove 81.

Furthermore, in this embodiment, a sampled signal acquired by the alcohol measurement module is processed by a current-type amplification circuit. Referring to a schematic diagram showing a circuit structure of FIG. 6, a switch transistor is connected in parallel to two ends of the alcohol measurement module, and is a P-type MOS transistor herein. The MOS transistor is opened during sampling, and the MOS transistor is closed to discharge the alcohol measurement module after sampling, so that the charge balance of the alcohol measurement module can be maintained when no measurement is performed. During a specific operation, when the alcohol measurement module samples an air containing a certain concentration of alcohol, the current will change, the current signal is converted into a voltage signal which is amplified and then sent to the MCU processor for processing, and finally a result is output in the form of a digital signal.

As shown in FIG. 6, the current-type sampling and amplification circuit comprises an operational amplifier U1, a first capacitor C1, a first resistor R1, a second resistor R2, a third resistor R3 and a fourth resistor R4. A source electrode of the P-type MOS transistor and a non-inverting input end IN+ of the operational amplifier U1 are both connected to one end of the alcohol measurement module J1, a drain electrode of the P-type MOS transistor is connected to the other end of the alcohol measurement module J1, and the other end of the alcohol measurement module J1 is further connected to an inverting input end IN− of the operational amplifier U1 by means of the first resistor R1. A grid electrode of the P-type MOS transistor and a positive power supply of the operational amplifier are both connected to a power supply VDD, the grid electrode of the P-type MOS transistor is further grounded sequentially by means of the second resistor R2 and the third resistor R3, and a connection point of the second resistor R2 and the third resistor R3 is also connected to the non-inverting input end IN+ of the operational amplifier U1. The first capacitor C1 and the fourth resistor R4 are both connected in parallel between the inverting input end IN− of the operational amplifier U1 and an output end OUT of the operational amplifier, and the output end OUT of the operational amplifier U1 is connected to an input end of the MCU processor by means of an RC circuit.

In this embodiment, the MCU processor is a single chip microcomputer, and the input end of the MCU processor is an analogue input signal end. The operational amplifier U1 is an operational amplifier having a high amplification factor. Since the signal sampled by the alcohol measurement module J1 is a weak signal, the principle of inverting amplification with a single power supply is adopted, and a bias voltage is set at the non-inverting input end and can be adjusted. The signal of the alcohol measurement module J1 is processed by the sampling and amplification circuit and then sent to the analog input signal end of the MCU processor through an RC filter circuit. Specifically, the current signal output from the alcohol measurement module J1 is converted into a voltage signal which is amplified and then sent to the analog input signal end of the MCU processor.

When the alcohol measurement module J1 samples an air containing a certain concentration of alcohol, the current will change, the sampled current signal is converted into a voltage signal which is amplified and then sent to the MCU processor for processing, the voltage signal is processed by the MCU processor to obtain an alcohol concentration value, and this concentration data is output through a digital interface of the MCU processor, so that the data of the alcohol sensor can be read from the outside by means of a processor or other smart communication devices.

In addition, the air pressure measurement module in the alcohol sensor of the present application comprises an air pressure sensor J2. The air pressure sensor provides a voltage signal, and can directly input this signal to the analogue input end of the MCU processor. After sampling the signal of the air pressure sensor J2, the MCU processor performs processing to obtain an air-blowing air pressure value $P_X$. When the air-blowing pressure of the user changes, the air pressure value $P_X$ changes accordingly, and the air-blowing degree of the user is determined according to the change of $P_X$. When the value of $P_X$ is greater than a set P1 (a normal air-blowing pressure value), the MCU processor starts to read a value of the alcohol measurement module J1, and to calculate the alcohol concentration. When the value of $P_X$ is less than the set P1 (the normal air-blowing pressure value), the alcohol measurement module J1 at this moment hardly detects the alcohol data, and it can be determined that the user blows insufficient air at that moment, no sensor data is read, and the user is notified to blow air again.

Since the air pressure sensor J2 is used to monitor the level of air-blowing pressure of the user, a starting point is set to P1; the alcohol measurement module J1 can measure the alcohol concentration value only when the air-blowing pressure of the user reaches P1 or above, and the alcohol concentration has a certain proportional relationship with the air pressure, so that the alcohol concentration value will be greater when the air-blowing pressure is higher. However, after the air-blowing pressure reaches a value P2, the alcohol concentration is no longer affected by the change in air pressure, this air pressure value is set to P2, the measured alcohol concentration is recorded as Gx, an actually output alcohol concentration value is recorded as $G_D$, and the relationship between the actually output alcohol concentration value and the measured alcohol concentration is as follows:

$$\text{if } P_X \langle P_1 : G_D = 0;$$
$$\text{if } P_1 \leq P_X \leq P_2 : G_D = k * \left(1 + \frac{p_2 - p_x}{p_2 - p_1}\right) * G_X;$$
$$\text{if } P_X \rangle P_2 : G_D = G_X;$$

where P1 represents an initial pressure value at which air blowing can start for measurement, P2 represents a pressure value at which the blown air is completely sufficient and the alcohol concentration does not change anymore, $P_X$ represents an actually measured pressure value during measurement, Gx represents a measured alcohol concentration value, and G D represents the actually output alcohol concentration value; k represents a measurement uncertainty factor (in the actual measurement, different sensors will have some uncertainty, and this uncertainty is used to adjust the accuracy of actual output). This concentration data is output through the digital interface of the MCU processor, so that the data of this sensor can be read from the outside by means of an MCU or other smart communication devices.

In the present application, the alcohol measurement module J1 and the air pressure measurement module are integrated within the housing, the air channel is also formed in the housing, and due to the air channel being in communication with the alcohol measurement module J1, the air pressure measurement module and the outside, it can be determined in real time whether insufficient air is being blown during measurement according to an air blowing situation of a user, the user is notified to blow air again or a valid real time concentration is displayed, and the authenticity and accuracy of measurement can still be guaranteed while reducing the size of the alcohol sensor.

The present application further provides a smart device (not shown), comprising a main body in which the air blowing method-based alcohol sensor as described above is arranged. Due to the small size and accurate testing, the alcohol sensor can be widely applied to mobile phones, or daily wearable devices, such as wristbands, watches and glasses.

The above embodiments are merely preferred embodiments of the present application but not intended to limit the present application, and any modifications, equivalent replacements, improvements, etc. made within the spirit and principle of the present application should be included within the scope of protection of the present application.

The invention claimed is:

1. An air blowing method-based alcohol sensor, comprising: an alcohol measurement module, an air pressure measurement module, an Microcontroller Unit (MCU) processor, a circuit substrate, and a housing coveringly arranged on the circuit substrate, wherein the alcohol measurement module transmits a concentration signal thereof to the MCU processor by means of a sampling and amplification circuit module, the air pressure measurement module and the MCU processor are mutually connected and implement transmission of an air pressure signal, and the MCU processor, after performing processing on the concentration signal and the air pressure signal, outputs an alcohol concentration value;

wherein the housing is provided with a first accommodating cavity in communication with the outside, the alcohol measurement module is arranged in the first accommodating cavity, the bottom of the housing is provided with a second accommodating cavity, the top of the housing is provided with an air channel in communication with the outside and the second accommodating cavity, and the air pressure measurement module is located in the second accommodating cavity;

wherein the alcohol measurement module comprises a first solid electrolyte membrane arranged in the first accommodating cavity, a first catalyst wire arranged at a top surface of the first solid electrolyte membrane and electrically connected to the MCU processor, and a second catalyst wire arranged at a bottom surface of the first solid electrolyte membrane and electrically connected to the MCU processor;

wherein the sensor further comprises a breathable film arranged at the top of the first accommodating cavity, wherein an external air passes through the breathable film to react with the first solid electrolyte membrane, the first catalyst wire and the second catalyst wire; and wherein a membrane pressing plate is further arranged in the first accommodating cavity and located at the bottom of the first solid electrolyte membrane, the membrane pressing plate fixes the first solid electrolyte membrane, the first catalyst wire and the second catalyst wire in the first accommodating cavity, and the membrane pressing plate is fixed in the first accommodating cavity by means of a sealant.

2. The air blowing method-based alcohol sensor of claim 1, wherein the air channel comprises a depressed opening at the top, a funnel-shaped channel extending downwardly along the depressed opening, and a columnar channel extending downwardly along the funnel-shaped channel, the columnar channel being in communication with the second accommodating cavity.

3. The air blowing method-based alcohol sensor of claim 1, wherein the air pressure measurement module is fixed to the circuit substrate by means of a flexible adhesive.

4. The air blowing method-based alcohol sensor of claim 1, wherein the housing is further provided with a third accommodating cavity, the MCU processor is located in the third accommodating cavity, and the third accommodating cavity is filled with a sealant for sealing the MCU processor.

5. The air blowing method-based alcohol sensor of claim 1, wherein a second solid electrolyte membrane is further arranged in the accommodating cavity and located at the bottom of the first solid electrolyte membrane, and the second catalyst wire is located between the second solid electrolyte membrane and the first solid electrolyte membrane.

6. The air blowing method-based alcohol sensor of claim 1, wherein a switch transistor is connected in parallel to two ends of the alcohol measurement module, and the sampling and amplification circuit module is a current-type sampling and amplification circuit.

7. The air blowing method-based alcohol sensor of claim 6, wherein the switch transistor is a P-type MOS transistor, and the current-type sampling and amplification circuit comprises an operational amplifier, a first capacitor, a first resistor, a second resistor, a third resistor and a fourth resistor, wherein a source electrode of the P-type Metal-Oxide-Semiconductor (MOS) transistor and a non-inverting input end of the operational amplifier are both connected to one end of the alcohol measurement module, a drain electrode of the P-type MOS transistor is connected to the other end of the alcohol measurement module, an inverting input end of the operational amplifier is connected to the other end of the alcohol measurement module by means of the first resistor, a grid electrode of the P-type MOS transistor and a positive power supply of the operational amplifier are both connected to a power supply Voltage Drain Drain (VDD), the grid electrode of the P-type MOS transistor is further grounded sequentially by means of the second resistor and the third resistor, and a connection point of the second resistor and the third resistor is also connected to the non-inverting input end of the operational amplifier; and the first capacitor and the fourth resistor are both connected in parallel between the inverting input end of the operational amplifier and an output end of the operational amplifier, and the output end of the operational amplifier is connected to an input end of the MCU processor by means of an RC circuit.

* * * * *